Aug. 5, 1952 W. H. KITTO ET AL 2,606,083
SPRING THRUST WASHER
Filed Oct. 17, 1947 2 SHEETS—SHEET 1
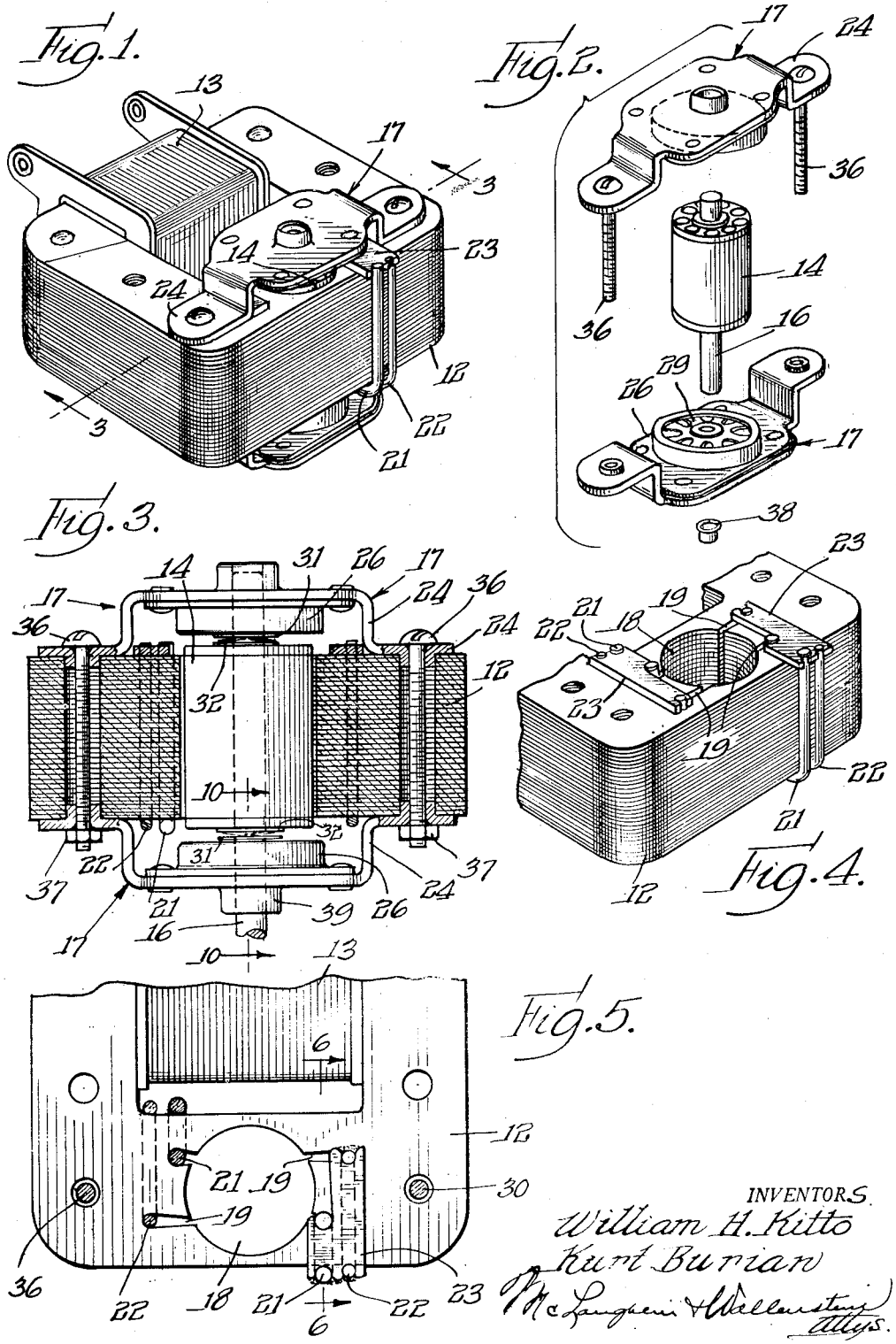
INVENTORS
William H. Kitto
Kurt Burian
McLaughlin & Wallenstein
Attys.

Aug. 5, 1952 — W. H. KITTO ET AL — 2,606,083
SPRING THRUST WASHER
Filed Oct. 17, 1947 — 2 SHEETS—SHEET 2
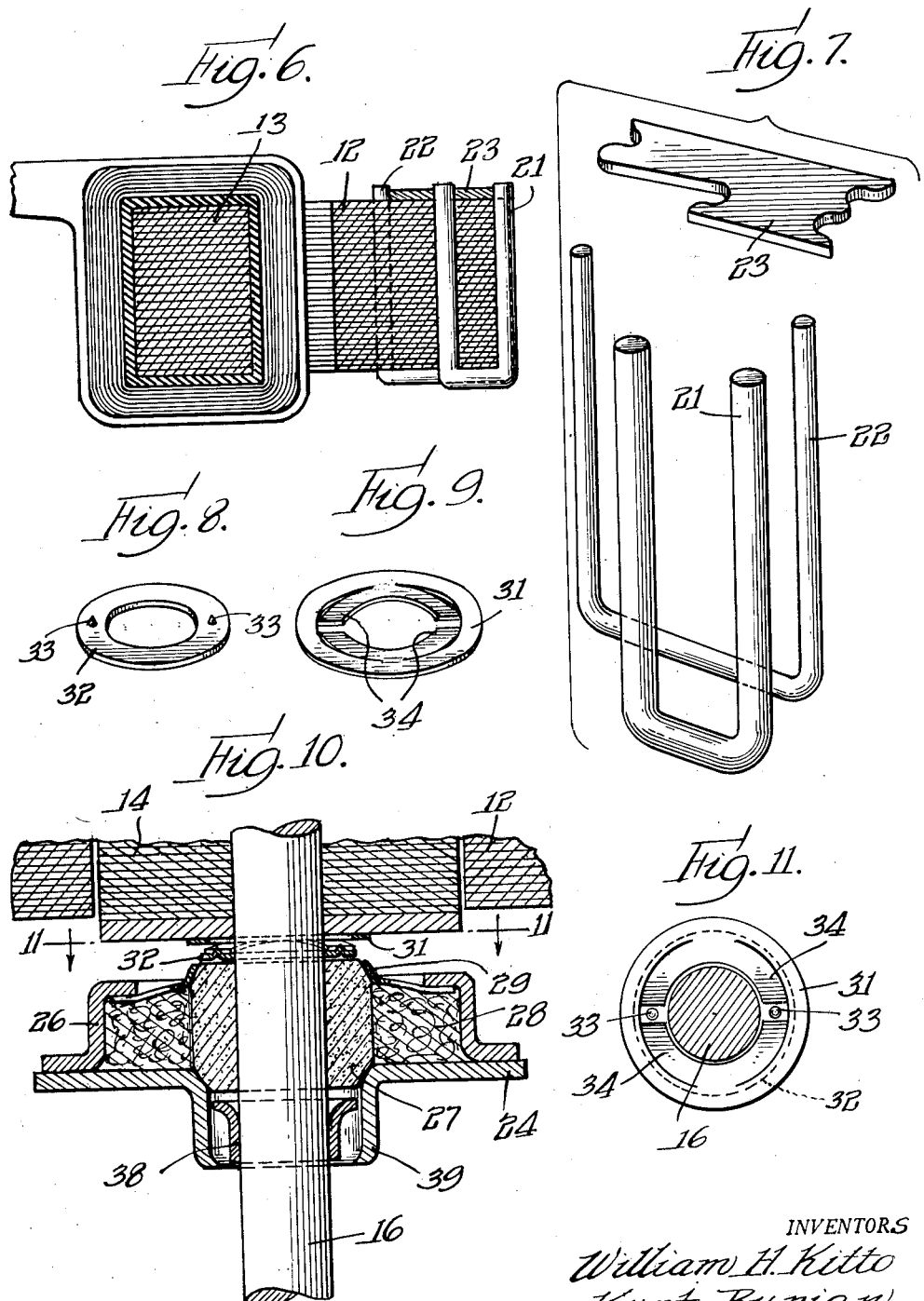
INVENTORS
William H. Kitto
Kurt Burian
McLaughlin & Wallenstein
Attys.

Patented Aug. 5, 1952

2,606,083

UNITED STATES PATENT OFFICE 2,606,083

SPRING THRUST WASHER

William H. Kitto and Kurt Burian, Chicago, Ill., assignors to G-M Laboratories, Inc., Chicago, Ill., a corporation of Illinois Application October 17, 1947, Serial No. 780,410

4 Claims. (Cl. 308—163)

Our invention relates to an improved construction of relatively small motors such as the type disclosed in Stewart et al. Patent No. 1,822,679.

Motors of the type identified have a tendency to produce excessive noise, particularly when employed under conditions where there may be a variable thrust load. By careful study of such motors, we have determined that the noise is in part caused by and in part aggravated by several factors, some of which, in the first instance, appear to be unrelated. Among the causes of the noise were vibrations produced by axial thrust, as when intermittent contact occurs between the rotating system and stationary parts, such as bearings, vibrations due to unequal resistances in the shading coil loops on opposite sides of the rotor and mechanical vibration of such loops due to alternation of the magnetic field in the stator, the latter being aggravated somewhat, possibly, by the first described axial thrust factor. So far as axial thrust is concerned, this becomes directly related to the bearing system, and the bearing system again involves lubrication, both of which have been taken into consideration in the improved construction which we employ. Such portion of the noise as is due to the shaded pole loops, we elimiante by providing a single piece stamping which is common to both loops of a pair and which links the loops together to complete the circuit between two U-shaped loop parts.

The principal object of our invention is the provision of an improved, relatively small, electric motor.

Another object is the provision of an electric motor which secures the advantages and overcomes the problems discussed hereinabove.

A motor constructed in accordance with our present invention is shown in the accompanying drawings wherein—

Fig. 1 is a perspective view;

Fig. 2 is an exploded view showing the rotor and bearing assemblies separated from each other;

Fig. 3 is a transverse sectional view taken on the line 3—3 of Fig. 1;

Fig. 4 is a fragmentary perspective view of the stator;

Fig. 5 is a fragmentary plan view of the stator with two of the shading loops broken away to illustrate structure;

Fig. 6 is a sectional view taken on the line 6—6 of Fig. 5;

Fig. 7 is an enlarged exploded view of the shading loop assembly;

Figs. 8 and 9 are enlarged perspective views of a flat and resilient steel washer, respectively;

Fig. 10 is an enlarged sectional view taken on the line 10—10 of Fig. 3; and

Fig. 11 is a transverse plan sectional view taken on the line 11—11 of Fig. 10.

Referring now to the drawings, the motor of our invention comprises a stator with the usual stack 12 of ferro-magnetic laminations, suitably shaped to provide stationary poles and having at least one alternating current coil 13. It also comprises a suitable rotor 14 secured to a rotor shaft 16 adapted to be journalled in bearing assemblies 17. The laminations are stamped to provide an opening 18 in which the rotor is adapted to rotate, opposite sides of the opening 18 forming the usual pole areas of a motor of this type.

The poles have unshaded, shaded and double shaded portions with slots 19 between such portions. Shading is accomplished by means of the usual copper loops, in our motor comprising, in each instance, two U-shaped loop members 21 and 22 having a common connecting member 23. The U-shaped and connecting members are formed of copper or other suitable highly conductive material and are secured together to form a substantially single piece assembly by soldering or brazing.

The bearing assemblies comprise a bearing bracket 24 to which is riveted an open cup-shaped member 26 within which is disposed a sintered, porous bearing 27 in which the shaft 16 is journalled (see Fig. 10) and an oil reservoir 28. A retainer 29 in the form of a spider completes the assembly.

Between the bearing 27 and rotor 14, we provide a split resilient washer 31, whose normal shape is shown in Fig. 9, and a flat washer 32 with projections 33, in the nature of embossments, which fall in the slits formed by the split and extending portions 34 of the resilient washer 31 to form interlocking means between the two washers. The relationship of the two washers is shown particularly in Figs. 10 and 11.

The motor is assembled by producing a sub-assembly of the laminations 12 and coil 13 in a usual manner and then assembling the shading loops therewith. The rotor is then placed in position and the bearing assemblies secured in position by means of bolts 36 and suitable nuts 37. After assembly, an oil slinger 38 is forced into position on the shaft 16 so as to lie within a cup-shaped boss 39 formed on the bearing bracket 17. The slinger need be applied only to one side of the shaft 16 when one short end is provided, as shown in the drawings, because the end of the shaft lying within the cup-shaped portion 39 can, itself, act as a slinger.

The construction described has advantages other than in the elimination of noise, although the latter is very important in the design as a whole. It will be noted that the resilient washer lies with its plane surface against the end of the rotor and the flat washer has its plane surface against the end or thrust surface of the sintered bearing. When these two washers are brought into contact, the embossments of the flat washer automatically position themselves between the split portions of the resilient washer and cause the two washers to turn together. There is sufficient friction between the relatively larger resilient washer and the rotor to cause the two to rotate together with negligible slippage and this tendency is further assured by the magnetic attraction which the rotor has for the resilient washer. The flat washer is then caused to rotate with the rotor assembly and the relative movement is, therefore, between the oily face of the bearing and the flat washer. Thus, friction and wear are greatly reduced by reason of maintaining an oil film between these two moving surfaces.

We have found that there is considerable tendency for oil to be discharged from sintered porous bearing and if the oil is suitably confined, a definite circulation can be traced. It is, therefore, important to avoid movement of the oil along the shaft and at one side we take care of this by the slinger arrangement described. At the inside face of the bearing, the flat washer tends to return the oil to the bearing reservoir and this tendency is maintained by the relative diameters of the two washers. We have found that if the flat washer is larger than the portions 34 of the resilient washer, then oil will not be transferred from the flat washer to the resilient washer and thence to the rotor, but will be retained by the bearing; while if the flat washer is smaller, then transfer does take place. It will be noted that the flat washer has about the same diameter as the adjacent portion of the bearing, and a film or meniscus of oil will be maintained between these parts.

One of the principal advantages of the structure described is the elimination of noise caused by intermittent contact of the rotating system and stationary bearings when there is a variable thrust load. In the past, washers of felt, oil proof rubber and the like have been employed for the purpose of absorbing energy of impact of the moving system against the bearing face. While noise has been prevented by this means, it has been impossible to retain the oil suitably; indeed, some expedients suggested, such as washers of felt-like materials, have complicated the oil problem by actually extracting oil from the bearing. Our resilient washer arrangement eliminates noise of the type referred to, but does it in such a way as to retain the oil and secure other advantages including those described. We have found, in other words, that a very small amount of resilience such as present in the ordinary resilient steel material is sufficient to completely eliminate axial vibration and noise and thereby we can solve both the problem of variable thrust and suppression of oil leakage.

The elimination of noise is further enhanced by the use of a connection common to both shading loops. The construction described not only reduces cost but makes it possible to maintain more uniform and lower loop resistances than by other methods heretofore employed. The relatively wide area of contact of the connecting link with the stator, and the connecting of the two loops together mechanically reduces vibration. The better soldering which results from the use of this construction causes the electrical resistance to be more uniform and thereby also reduces vibration.

What we claim as new and desire to protect by Letters Patent of the United States is:

1. In a motor of the character described which includes a stator, bearing assemblies, each having a bearing, secured to the stator, and a rotor including a rotor shaft journalled in said bearings, the improvement which comprises a resilient washer on the shaft between the rotor and a bearing, the resilient washer being split near the center with portions at the split extending at an angle to the washer, a flat side of the resilient washer being in direct contact with the rotor, a flat washer between the resilient washer and bearing, said flat washer having projections extending between the split portions of the resilient washer, the said resilient washer taking the load of a thrust movement of the shaft, and the relative movement being for the most part between the flat washer and bearing.

2. In a motor of the character described which includes a stator, bearing assemblies, each having a bearing, secured to the stator, and a rotor including a rotor shaft journalled in said bearings, the improvement which comprises a resilient washer on the shaft between the rotor and a bearing, the resilient washer being split near the center with portions at the split extending at an angle to the washer, a flat side of the washer being in direct contact with the rotor, a flat washer relatively smaller in diameter than the resilient washer but relatively larger in diameter than the split portion of the resilient washer, said flat washer being disposed between the resilient washer and bearing and in direct contact with said bearing, and being of approximately the same diameter as the portion of the bearing which it engages between the resilient washer and bearing, said flat washer having projections extending between the split portions of the resilient washer, the said resilient washer taking the load of a thrust movement of the shaft, and the relative movement being for the most part between the flat washer and bearing, and the smaller diameter flat washer preventing oil seepage along the shaft from the bearing to the rotor.

3. In a motor of the character described which includes a stator, bearing assemblies, each having a bearing provided with a thrust surface, secured to the stator, and a rotor including a rotor shaft journalled in said bearings, the improvement which comprises, a resilient washer on the shaft between the rotor and the bearing and in direct contact with the rotor, a flat washer on the shaft between the resilient washer and the bearing and engaging the resilient washer and the thrust surface of the bearing, and interlocking means between the resilient washer and the flat washer to cause them to turn as a unit, the diameter of the resilient washer being larger than the diameter of the thrust surface of the bearing so that relative movement for the most part is between the flat washer and the bearing.

4. In a motor of the character described which includes a stator, bearing assemblies, each having a bearing, secured to the stator, and a rotor including a rotor shaft journalled in said bearings, the improvement which comprises, a resilient washer on the shaft between the rotor and the bearing and in direct contact with the rotor, a flat washer on the shaft between the resilient washer and the bearing and engaging the resilient washer and the bearing, and interlocking means between the resilient washer and the flat washer to cause them to turn as a unit, said resilient washer being of larger diameter than the flat washer so that relative movement for the most part is between the flat washer and the bearing.

WILLIAM H. KITTO.
KURT BURIAN.

REFERENCES CITED

The following references are of record in the file of this patent:

UNITED STATES PATENTS

| Number | Name | Date |
| --- | --- | --- |
| 1,557,524 | Hanson | Oct. 13, 1925 |
| 1,822,264 | Apple | Sept. 8, 1931 |
| 1,983,091 | Larsh | Dec. 4, 1934 |
| 1,992,971 | Stewart | Mar. 5, 1935 |
| 2,009,124 | Skolfield | July 23, 1935 |
| 2,059,891 | Morse | Nov. 3, 1936 |
| 2,083,688 | Clements | June 15, 1937 |
| 2,193,713 | Cole | Mar. 12, 1940 |
| 2,251,673 | Gillen | Aug. 5, 1941 |
| 2,307,772 | Duffy | Jan. 12, 1943 |